United States Patent Office 3,140,646
Patented July 14, 1964

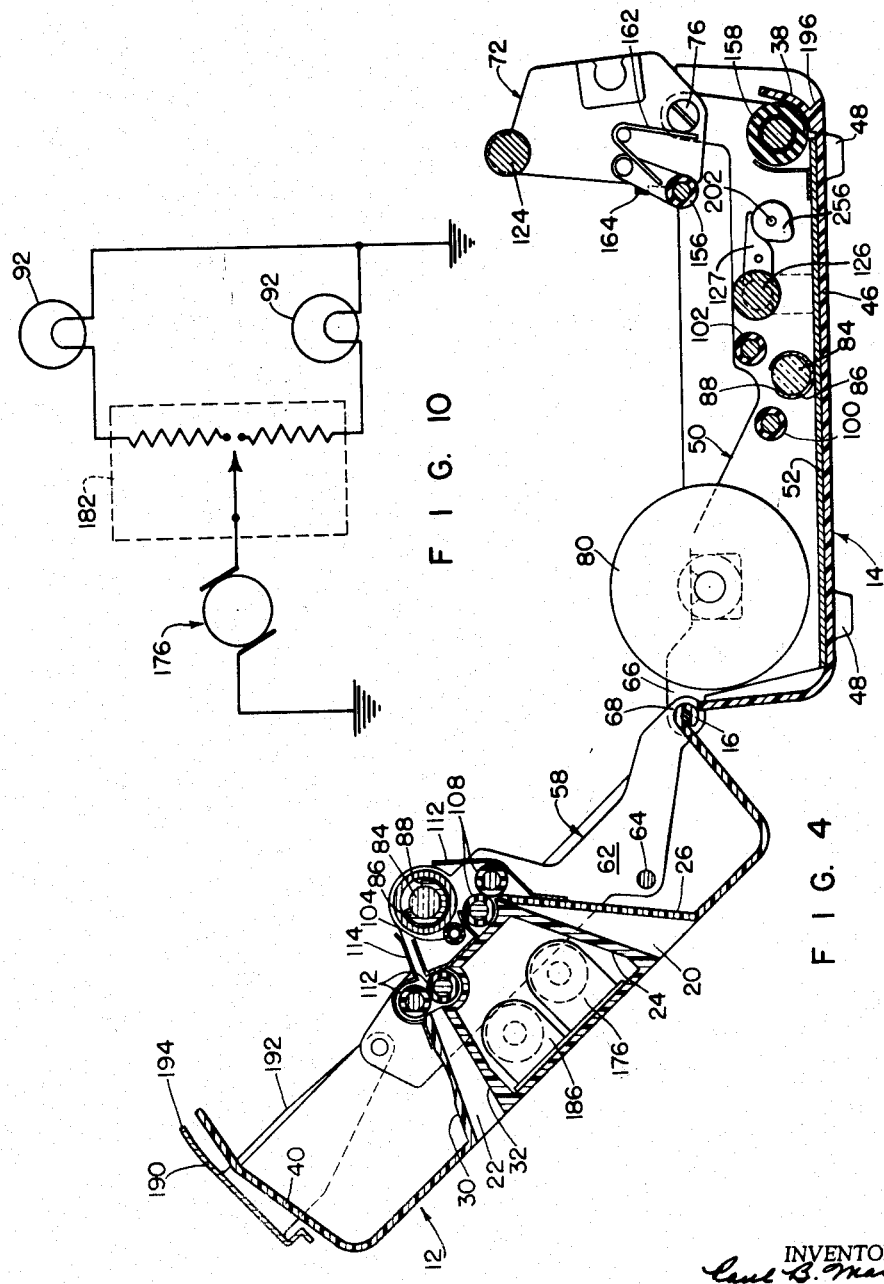

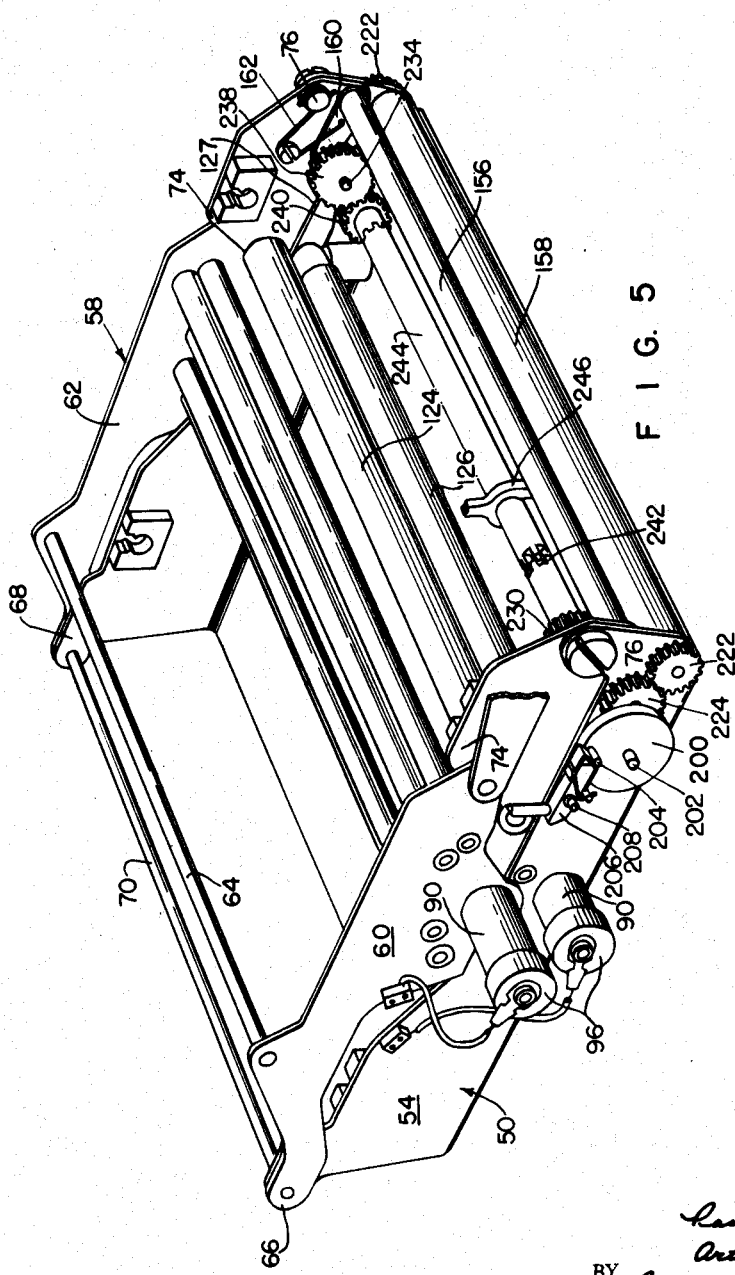

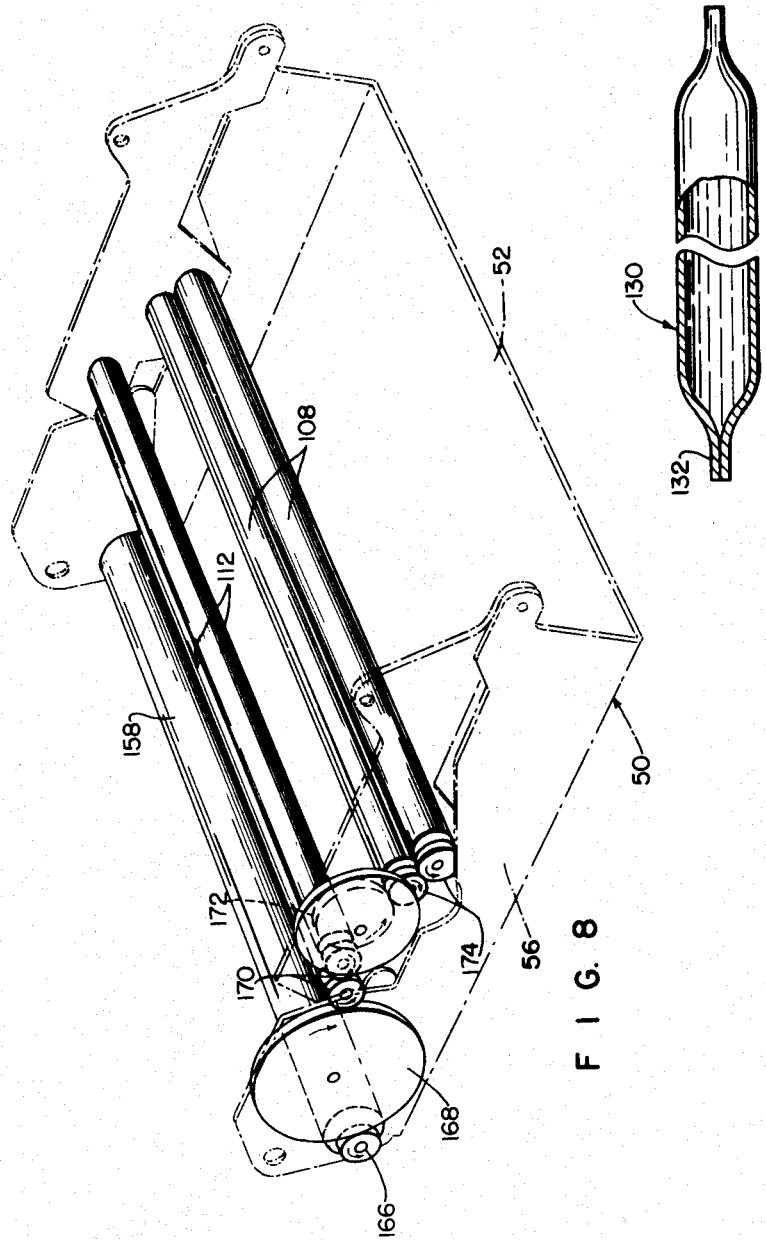

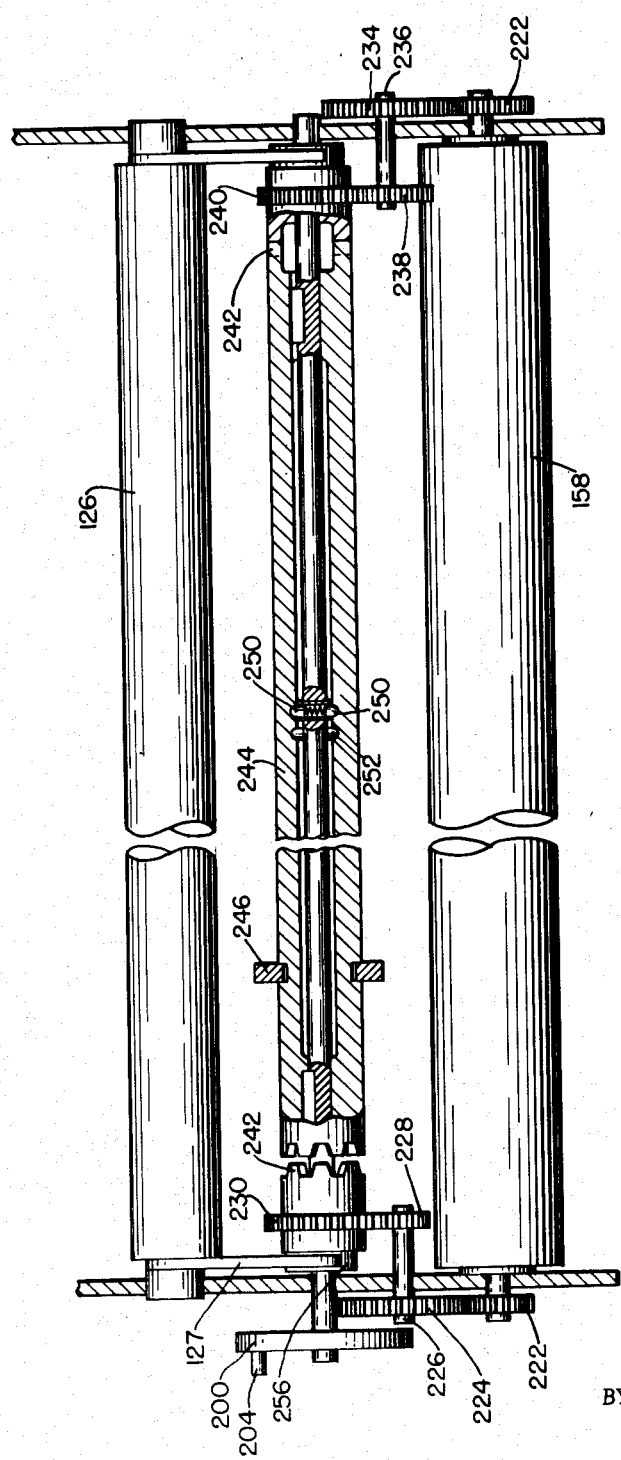

3,140,646
PHOTOGRAPHIC DOCUMENT COPYING APPARATUS
Paul B. Mason, Magnolia, and Arthur J. Sable, Boston, Mass., assignors to Polaroid Corporation, Cambridge, Mass., a corporation of Delaware
Filed Aug. 23, 1961, Ser. No. 133,398
14 Claims. (Cl. 95—75)

This invention relates to photographic apparatus and, more particularly, to photographic apparatus for making copies of original documents.

This application is concerned with photographic document copying apparatus of the type in which an original document to be copied is superposed with a portion of an elongated sheet of photosensitive image recording material (referred to as a photosensitive sheet); the superposed original and portion of the photosensitive sheet are moved past a source of illumination for exposing the photosensitive sheet; and the exposed portion of the photosensitive sheet is then processed to produce a positive copy. Processing is accomplished by advancing the exposed portion of the photosensitive sheet into superposition with a second, or image-receiving sheet, and distributing a processing fluid between the sheets to form a sandwich which is advanced through an opening in the apparatus by grasping and pulling a portion of the sandwich projecting from the apparatus. The photosensitive and second sheets are provided in sufficient length to produce a plurality of copies and, in the operation of the apparatus, each original document is introduced into the apparatus, is advanced in superposition with a portion of the photosensitive sheet during exposure thereof, and is then ejected from the apparatus while a predetermined length of the photosensitive sheet (and second sheet) is advanced, by pulling, through the apparatus in order to effect exposure and processing.

An object of the invention is to provide, in photographic document copying apparatus of the type described, novel and improved indexing means for controlling the advancement of a photosensitive sheet through the apparatus by allowing a predetermined length of said photosensitive sheet, including an exposed and processed portion thereof, to be moved through and from the apparatus, and then arresting the movement of the photosensitive sheet.

Most documents to be copied are of one of two standard lengths, to wit, 11 and 14 inches; and for this reason the invention has, as another object, the provisions of a document copying apparatus as described in which the indexing means can be selectively preset to permit the advancement of a predetermined length of the photosensitive sheet, which length is a function of the length of the original being copied.

Distribution of the processing fluid between the superposed photosensitive and second sheets is effected by advancement of the sheets, with the fluid therebetween, between a pair of juxtaposed pressure-applying members, one of which is movable toward and away from the other and is biased toward the other. Distribution of the fluid thus involves movement of a mass of the fluid relative to, between and in contact with the sheets in a direction opposite the direction of advancement of the sheets between the pressure-applying members.

The invention has, as a further object, the provision, in document copying apparatus as described, of means for so trapping the processing fluid between the photosensitive and second sheets as to prevent fluid, employed to process an exposed portion of the photosensitive sheet, from being spread into contact with a succeeding exposed portion of the photosensitive sheet, trapping being effected by spacing apart the pressure-applying members during advancement of the photosensitive sheet after an exposed portion of the photosensitive sheet has passed between the pressure-applying members.

Other objects of the invention will in part be obvious and will in part appear hereinafter.

The invention accordingly comprises the apparatus possessing the construction, combination of elements and arrangement of parts which are exemplified in the following detailed disclosure, and the scope of the application of which will be indicated in the claims.

For a fuller understanding of the nature and objects of the invention, reference should be had to the following detailed description taken in connection with the accompanying drawings wherein:

FIG. 4 is a view similar to FIG. 3 showing the components of the apparatus in an inoperative position in which the components are spaced apart to permit loading of sheet materials into the apparatus;

FIG. 5 is a perspective view of components of the apparatus shown with the outer housing removed;

FIG. 8 is a view similar to FIG. 5 illustrating components of the apparatus;

FIG. 9 is a fragmentary view, partially in section, of a fluid container for introducing processing fluid into the apparatus;

FIG. 10 is an electrical diagram showing the electrical components of the apparatus;

FIG. 11 is a somewhat diagrammatic, plan view, partially in section, illustrating the indexing system of the invention.

Figure 1:
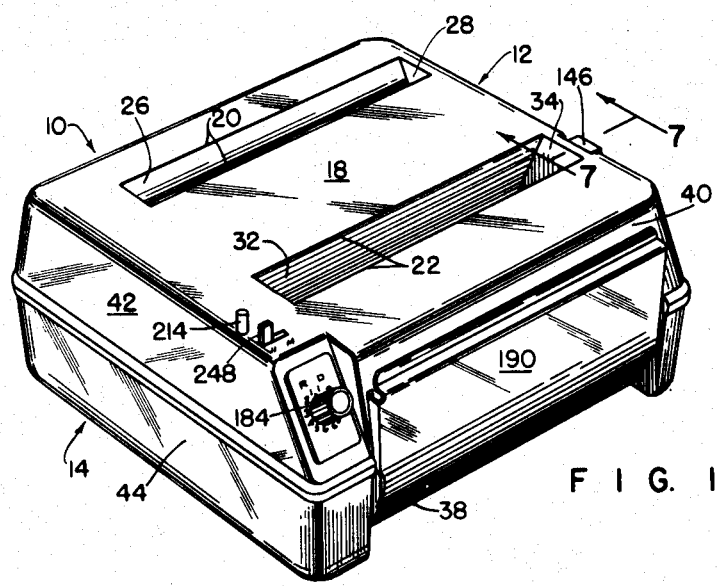
FIGURES 1 and 2 are perspective views of document copying apparatus embodying the invention.
Figure 2:
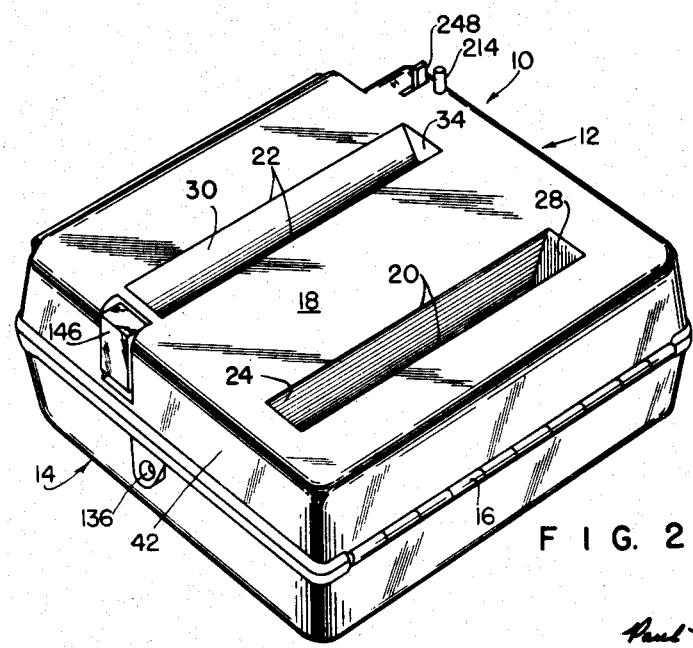

The present invention comprises document copying apparatus of the type shown in the copending application of Edwin H. Land et al., Serial No. 133,483, filed August 23, 1961, and comprising a portable hand-operated device which does not require an external source of power and, accordingly, can be used anywhere. The operation of this type of document copier is quite simple, requiring only that the operator introduce a fluid-filled, straw-shaped container of a processing fluid into the apparatus, then withdraw the container, introduce an original document to be copied into an opening in the apparatus, and then grasp a pair of photosensitive and second sheets projecting from the apparatus and pull the sheets directly from the apparatus to effect the production of a copy of the document. The apparatus can be used, alternatively, to make copies directly by exposing through the original or to make so-called reflex copies in which light is reflected from the original. Moreover, the process performed by the apparatus is essentially dry, so that there is no danger of spillage of liquids from tanks in which the sheets are immersed, and the copy is delivered from the apparatus immediately following exposure in a dry condition.

Reference is now made to FIGS. 1 through 5 wherein there is illustrated one form of photographic document copying apparatus embodying the invention. This apparatus comprises a housing, designated 10, for mounting and enclosing the components of the apparatus. Housing 10 comprises an upper housing section 12 and a lower housing section 14 pivotally secured to one another at a hinge 16 located at one end (termed the rear end) of the housing. The two housing sections are pivotable between the closed or operative position shown in FIGS. 1 through 3, in which the components of the apparatus are in operative relation, and the open or inoperative position shown in FIG. 4 in which the two housing sections are located apart from one another to permit loading of photographic materials into the apparatus in preparation for use.

Upper housing section 12 includes an upper wall 18 including means defining an inlet passage 20 and exit passage 22 through which an original document to be copied can be, respectively, introduced into and fed from the apparatus. Inlet passage 20 is defined by convergent walls designated, for purposes of description, as a forward wall 24, a rear wall 26 and side walls 28. Exit passage 22 is similarly defined by a forward wall 30, rear wall 32 and side walls 34. The housing sections include portions defining a withdrawal opening 36 at the forward end of the housing through which photographic sheet materials, including copies produced by the apparatus, are withdrawn from the housing. Withdrawal opening 36 is defined by a forward end wall 38 on lower housing section 14 and a forward end wall 40 on upper housing section 12. Forward end wall 38 extends upwardly at an angle toward the front of the housing and forward end wall 40 extends downwardly at an angle toward the front of the housing at an angle toward the rear of the housing where the lower edge of forward end wall 40 cooperates with the upper edge of forward end wall 38 to define withdrawal opening 36.

Housing 10 includes upper side walls 42 on upper housing section 12 and lower side walls 44 on lower housing section 14. Lower housing section 14 also includes a bottom wall 46 on which are mounted feet 48 which serve to support the apparatus, and which are preferably formed of a material, such as rubber, having a high coefficient of friction for preventing the apparatus from sliding on the surface on which it is supported during use.

The operative components of the document copying apparatus are mounted on support members or chassis carried within housing 10 on the upper and lower housing sections. These support members include a lower chassis or frame 50 comprising a base plate 52 and side plates 54 and 56 extending upwardly from the base plate which rests on bottom wall 46 of lower housing section 14. An upper chassis or frame 58 is provided comprising side plates 60 and 62 which may be joined by connecting rods 64. Side plates 54 and 56 are provided with hinge extensions 66 and side plates 60 and 62 are similarly provided with hinge extensions 68. The hinge extensions of the upper and lower chassis or frames are pivoted at hinge 16 on a common hinge pin 70. Upper chassis 58 is secured within upper housing section 12 so that the upper chassis and housing section pivot together about hinge pin 70.

The apparatus includes an intermediate chassis or frame 72 comprising a pair of arms 74 pivotally mounted adjacent their ends on side plates 54 and 56 adjacent the forward ends of the side plates. Arms 74 are pivotally mounted at studs 76 secured in side plates 54 and 56 so that intermediate chassis 72 may be pivoted between the operative position, shown in FIG. 3, to the inoperative position of FIG. 4 which permits loading of photographic materials into the apparatus.

The document copying apparatus of the invention is designed to produce copies of original documents by a photographic process involving the exposure of a photosensitive sheet and the treatment of the exposed photosensitive sheet with a fluid to produce a transfer image in a second or image-receiving sheet which is superposed with the exposed photosensitive sheet during treatment of the latter. The photosensitive sheet, herein designated 77, preferably comprises a photosensitive silver halide carried on a suitable support. The silver halide may be in the form of a gelatin emulsion and the support may comprise any of the conventional film base materials, paper being preferable because of its inexpensiveness. Exposure of the photosensitive material may be of one of two different types, i.e., "reflex" or "direct." "Direct" exposure of the photosensitive material involves exposure of the silver halide to light transmitted through the original to the photosensitive material, and is useful when the original has subject matter on only one surface and the material comprising the original is transmissive to light actinic to the photosensitive material. When the original has subject matter on both sides or is not transmissive to actinic light, then "reflex" exposure is used and this involves transmitting the actinic light through the photosensitive sheet to the surface (to be copied) of the original which reflects some of the light back to the photosensitive material, further exposing the photosensitive material to form a developable image therein.

Following exposure, the photosensitive material is treated with a fluid in conjunction with a second or image-receiving sheet, herein designated 78, superposed with the photosensitive sheet to form a transfer image on the image-receiving sheet. Image formation is effected by a silver halide diffusion transfer-reversal process distinguished by the fact that it is an essentially dry process, in which the fluid effecting the processing is confined between the sheets, obviating the necessity for tanks of fluid in which the sheets are immersed.

In this type of photographic transfer process, the photosensitive and second sheets are superposed and a fluid is distributed between the sheets by advancement of the superposed sheets in superposition between a pair of pressure-applying members. The two sheets are retained in superposition for a predetermined period during which a silver halide developer in the processing fluid reduces exposed silver halide to silver and unexposed silver halide is converted to a soluble complex which is transferred by diffusion to the image-receiving sheet where it is reduced to silver to form a positive transfer image. The image-receiving sheet may include an image-receptive layer carried on a suitable support such as paper, or it may function as a support for a layer in which the image is formed.

For examples of processes of this type and materials useful therein, reference may be had to U.S. Patent Nos. 2,543,181, issued February 27, 1951, and 2,662,822, issued December 15, 1953, both in the name of Edwin H. Land.

The apparatus comprises means for holding a supply of photosensitive sheet 77, preferably in the form of an elongated web or strip of sufficient length to make a large number of copies. This means comprises a conventional spool 80 and means on side plates 54 and 56 of lower chassis 50 for mounting the spool at its ends for pivotal movement between the side plates within the rearmost portion of housing 10. Arms 74 of intermediate chassis 72 are provided with means for mounting a second spool 82 on which is coiled a supply of image-receiving sheet 78 substantially equal in length and width to photosensitive sheet 77. The supply of second sheet 78 on spool 82 is enclosed within housing 10 at the forward end of the housing.

The document copying apparatus of the invention includes means for subjecting the photosensitive material to both reflex and direct types of exposures. The exposure means comprises two sources of illumination and means for conducting the photosensitive sheet and an original in superposition past the sources of illumination to effect exposure of the photosensitive sheet. An advantage of the present apparatus resides in the fact that the photosensitive material can be very sensitive because it is kept in a light-free environment; and the use of a "fast" photosensitive material means that the light source does not have to be anywhere as near as intense as that required if the photosensitive sheet material were to be handled in the light. The sources of illumination are essentially the same, and each comprises an elongated bar or rod 84 of a transparent material such as glass or an organic plastic. Bar 84 is substantially circular in cross section, is at least equal in length to the width of the photosensitive sheet material, and is provided with a polished surface throughout, so that the bar functions to conduct light from a source at one end toward its other end. Bars 84 are each enclosed in a cylindrical tube 86 formed of a material such as metal, which is opaque to light actinic to the photosensitive material and is provided with an axial slot 88 at least equal in length to the width of the photosensitive sheet for transmitting light emitted from bar 84. One of the sources of illumination is mounted on upper housing section 12 and the other is mounted on lower housing section 14, and the photosensitive sheet and original are guided in superposition between the two sources of illumination so that the photosensitive sheet may be subjected to either a reflex or direct exposure. One of tubes 86 is mounted at one end in side plate 56 with its other end sections, designated 90, extending through an opening in side plate 54. The other tube 86 is similarly mounted with one end secured in side plate 62 and its other end section 90 extending through an opening in side plate 60.

The sources of illumination are in the form of incandescent lamps 92, each mounted within end section 90 of a tube 86 adjacent the end of the bar 84 contained within the tube. Each lamp 92 can be quite small since the luminance requirements need not be great, and each is shown mounted in a reflector 94 carried on end cap 96 secured to end section 90 of the tube. Tubes 86 and bars 84 contained therein are mounted with their axes substantially parallel and with slots 88 facing one another. The cylindrical surface of each of bars 84 is provided with a roughened or scratched area extending lengthwise of the bar and covering a longitudinal portion of the cylindrical surface disposed opposite the slot 88 of the tube 86 in which the bar is enclosed. This roughened surface functions as a diffusing reflector for reflecting light transmitted by the bar from lamp 92 radially through the slot in the tube. In order to insure uniformity of light emitted by each bar throughout the length of the slot through which the emitted light is transmitted, the area of the roughened or scratched surface portion varies in its angular dimension from end to end of the bar, this area being smaller at the end closest the lamp and larger at the end furthest from the lamp. The roughened areas of the bars are shown as being made up of a plurality of axial scratches or grooves of varying lengths.

The guide means of the invention includes a cylindrical tube 98 formed of a material such as glass or organic plastic capable of transmitting light actinic to the photosenstive material. Tube 98 has an inside diameter greater than the outside diameter of tube 86 and is mounted in surrounding relation to the tube 86 which is mounted on upper chassis 58. A pair of elongated guide rolls 100 and 102 are provided mounted for rotation on and intermediate side plates 54 and 56. Guide rolls 100 and 102 are positioned with their axes substantially parallel with one another and with the axes of bars 84 and tubes 86, and are located for engaging tube 98 at positions spaced from one another around the periphery of the cylindrical surface of tube 98. A backing roll 104 is provided mounted for rotation on and intermediate side plates 60 and 62 in position for urging tube 98 against guide rolls 100 and 102.

Photosensitive sheet 77 is conducted from spool 80 between guide roll 100 and tube 98 around a portion of the cylindrical surface of tube 98 and between guide roll 102 and tube 98. Slots 88 in tube 86 are positioned for transmitting light from bars 84 for exposing the portion of the photosensitive sheet supported by tube 98 intermediate guide rolls 100 and 102, and the sources of illumination are designed to be used selectively and one at a time for exposing the photosensitive sheet as it is advanced around the portion of tube 98 between guide rolls 100 and 102 past slots 88 in tubes 86.

Figure 3:
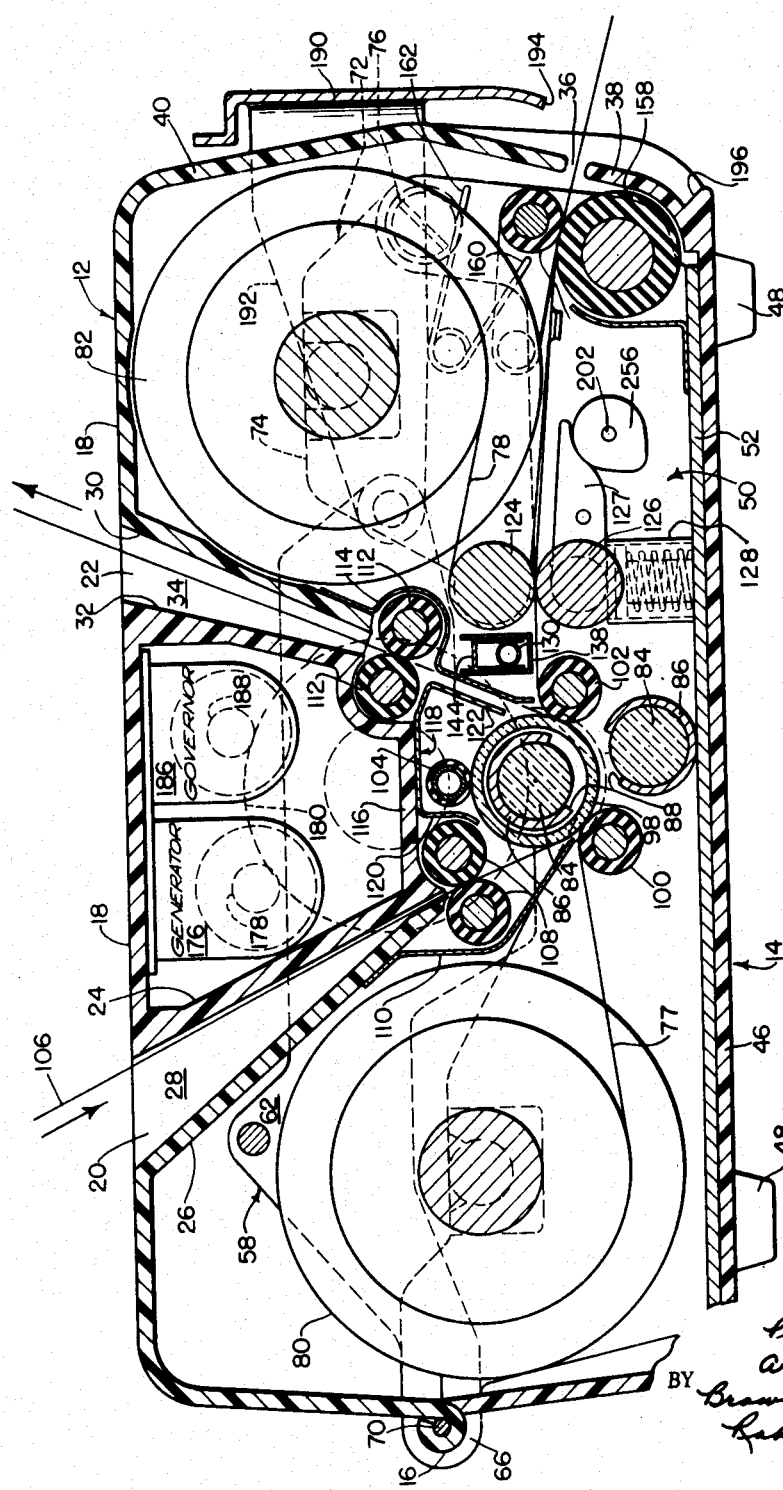
FIG. 3 is a sectional view of the apparatus of FIGS. 1 and 2, the section being taken along a plane substantially midway between the sides of the apparatus.
Figure 7:
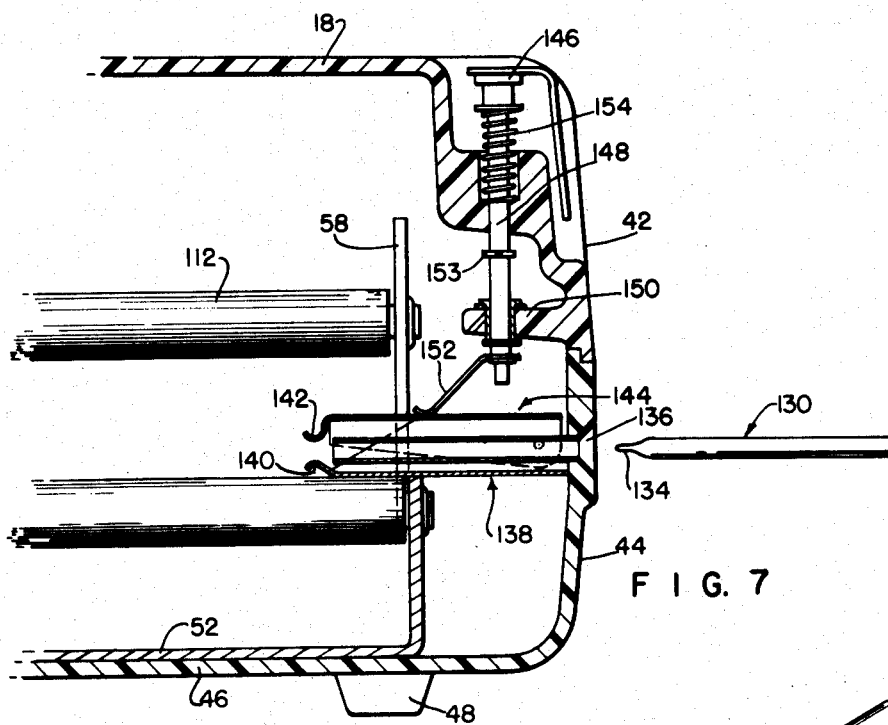
FIG. 7 is a sectional view taken substantially along the line 7—7 of FIG. 1.
Figure 6:
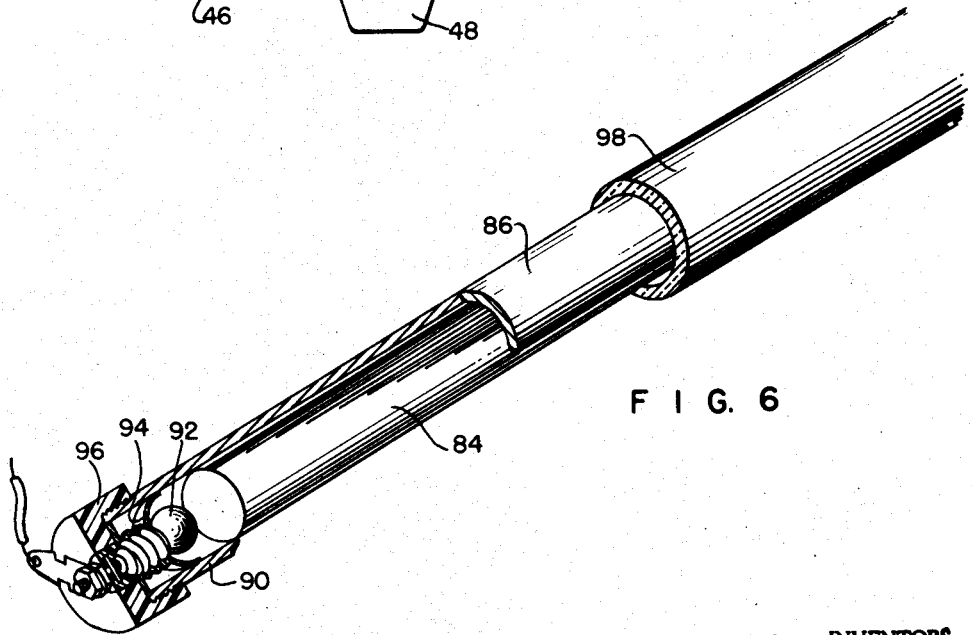
FIG. 6 is a fragmentary perspective view, partially in section, of a light source employed in the document copier.

During exposure of photosensitive sheets 77, an original document, designated 106 in FIG. 3, is superposed with the photosensitive sheet between the latter and tube 98. The original is introduced through passage 20 and means are provided for sealing the passage against the admission of light and guiding and feeding the original into superposition with photosensitive sheet 77 at the bite of guide roll 100 and tube 98. In the form shown, the light-sealing and feeding and guiding means comprise a pair of inlet feed rolls 108 mounted for rotation in juxtaposition with their axes substantially parallel, within housing 10, on and between side plates 60 and 62. Inlet feed rolls 108 include resiliently deformable surfaces and are positioned with the bite of the feed rolls located in alignment with the inner end of passage 20 in position for engaging original 106 and advancing the original toward the bite of tube 98 and guide roll 100. The inlet feed rolls engage the original along a line lying in a plane substantially tangent to the surface of tube 98 at a line at least closely adjacent the line of contact between tube 98 and guide roll 100. At least one of inlet feed rolls 108 is driven for advancing original 106 through passage 20 into the bite of tube 98 and guide roll 100 between the tube and photosensitive sheet 77. A light-sealing element 110 is provided dependent from rear wall 26 and extending downwardly to the rear of the rearmost inlet feed roll 108 and forwardly to a position adjacent the bite of tube 98 and guide roll 100 for insuring against exposure of the photosensitive sheet to light transmitted through passage 20.

As a means for feeding original 106 from the housing through passage 22 following exposure of the photosensitive sheet in superposition with the original, there are provided a pair of outlet feed rolls 112 mounted for rotation in juxtaposition and with their axes parallel on and between side plates 60 and 62. The construction of outlet feed rolls 112 is similar to that of inlet feed rolls 108 and the outlet feed rolls are positioned with the bite of the rolls located at the inner end of exit passage 22 in position for engaging the original along a line lying in a plane substantially tangent to both tube 98 and guide roll 102. The document copying apparatus is designed for copying originals which are substantially flat and tend to assume a planar configuration so that as an original 106 is advanced from between the bite of tube 98 and guide roll 102, the leading edge of the original tends to move in a plane tangent to tube 98, guide roll 102 and outlet feed rolls 112 so as to enter the bite of the outlet feed rolls and become engaged thereby. At least one of the outlet feed rolls is driven for advancing the original from the housing through exit passage 22. Additional light-sealing means are provided for exit passage 22 and, in the form shown, comprise a light-sealing element dependent from forward passage wall 30 extending around the forwardmost outlet feed roll 112 to a position adjacent guide roll 102. Light-sealing element 114 performs the additional function of aiding in guiding the leading end of the original from between tube 98 and guide roll 102 into the bite of outlet feed rolls 112. The housing includes an inner wall 116 extending between forward passage wall 24 and rear passage wall 32. Mounted on inner wall 116 is a light-sealing element 118 having a first dependent portion 120 extending downwardly between the forwardmost inlet feed roll 108 and tube 98 and a second dependent portion 122 extending downwardly from a position adjacent the rearmost outlet feed roll 112 to a position adjacent tube 98. Second dependent portion 122 cooperates with the lower portion of light-sealing element 114 to provide a passage for guiding the original from between tube 98 and guide roll 102 into the bite of outlet feed rolls 112.

As previously noted, the exposed photosensitive sheet 77 is processed to produce a positive copy of the original by superposing the photosensitive sheet with a second or print-receiving sheet 78 and distributing a processing fluid between the superposed sheets to form a sandwich. The means in the apparatus of the invention for performing this processing comprise a pair of pressure-applying rolls 124 and 126, roll 124 being mounted for rotation on intermediate chassis 72 and roll 126 being mounted on arms 127 pivotally mounted intermediate their ends on lower chassis 50 so that the axes of the rolls lie in substantially a common plane when the apparatus is in the operative position shown in FIG. 3. Rolls 124 and 126 are located adjacent guide roll 102, and roll 126 is mounted for limited movement toward and away from roll 124, spring means 128 being provided on arms 127 for biasing roll 126 toward roll 124. Photosensitive sheet 77 extends from between tube 98 and guide roll 102 between rolls 124 and 126 and image-receiving sheet 78 is conducted from spool 82 around roll 124 into superposition with the photosensitive sheet between rolls 124 and 126. Mounting of spool 82 and pressure-applying roll 124 on intermediate chassis 72 permits the photosensitive and image-receiving sheets to be threaded in superposition between the pressure-applying rolls.

In the form of document copying apparatus shown, the processing fluid for each exposed area of the photosensitive sheet is provided on the photosensitive sheet in the form of an elongated mass extending from side to side of the exposed area of the sheet near the leading edge of the exposed area, that is, on the portion of the photosensitive sheet extending between guide roll 102 and the bite of pressure-applying rolls 124 and 126. Advancement of the photosensitive and second sheets in superposition between the pressure-applying rolls causes this mass of fluid to be distributed between the sheets toward the trailing end of the exposed area of the photosensitive sheet. It is contemplated that the processing fluid required for each exposed area of the photosensitive sheet, in order to produce a positive copy on the image-receiving sheet, will be supplied in an elongated tubular container very much like a conventional drinking straw. This container, designated 130 in FIG. 9, includes a cavity of substantially uniform cross section approximately equal in length to the width of the exposure area of the photosensitive sheet and filled with the processing fluid. Both ends of the container are sealed to prevent escape of the fluid and the admission of air into the container, and one end, termed the trailing end and designated 132, is constructed so as to become unsealed in response to the generation of hydraulic pressure within the fluid, to form a discharge mouth preferably equal in area to the cross sectional area of the fluid-filled cavity through which the fluid contents of the container are discharged. Containers of this type, their construction and function are described in detail in the copending U.S. application of Edwin H. Land, Serial No. 820,266, filed June 15, 1959, now Patent No. 3,047,387.

The apparatus includes means permitting the container to be introduced into the apparatus so that it extends across and adjacent the portion of photosensitive sheet 77 extending between guide roll 102 and the bite of the pressure-applying rolls. This means comprises a tapered opening 136 in lower side wall 44. Mounted within the housing in alignment with opening 136 is a channel-shaped guide member 138 which extends from the tapered opening into the housing past the edge of the photosensitive sheet for supporting and guiding container 130 into the housing into a position extending across and adjacent the photosensitive sheet. The container is introduced into the housing until the leading end is located adjacent the margin of the photosensitive sheet furtherest from opening 136 and the leading end of the fluid-filled cavity is located adjacent the lateral edge of the exposure area. The container is then compressed at a position in the region of the edge of the exposure area closest opening 136 and simultaneously withdrawn from the apparatus through opening 136. This causes the leading end of the container to become unsealed and the fluid contents of the container to be ejected therefrom in the form of a uniformly distributed elongated mass extending across the portion of the photosensitive sheet extending between guide roll 102 and the pressure-applying rolls.

Means are provided for compressing the container, as described, during its withdrawal in order to cause ejection of the fluid from the container. This means comprises a turned-up curved lip 140 on guide member 138 and a corresponding juxtaposed lip 142 on the end of a channel-shaped pressure member 144 mounted for limited pivotal movement inside guide member 138 in such a way that the guide member and pressure member cooperate to form a tube through which the straw-shaped pod is introduced and withdrawn. A manually operable push button 146 mounted in a recess in upper wall 18 and side wall 42 is provided for pivoting pressure member 144 so that lip 142 is urged toward lip 140 to apply compressive pressure to the container. Push button 146 actuates a plunger rod 148 supported for axial movement in a bracket 150 extending inwardly from upper side wall 42. A spring arm 152 is connected to the inner lower end of plunger rod 148 and bears against pressure member 144 for pivoting the pressure member toward guide member 138 when button 146 and plunger rod 148 are depressed. A split ring 153 is provided on rod 148 as a stop for limiting the downward movement of the rod to prevent undue pressure from being applied to the container. The pressure applied the container is limited by the resilience of spring arm 152 and this, together with the stop, prevents the container from being compressed so that it might break when withdrawal is attempted. A spring 154 is provided for biasing the push button and plunger arm outwardly.

The photosensitive and print-receiving sheets comprising the sandwich formed by pressure-applying rolls 124 and 126 are required to remain in superposition during a predetermined imbibition (processing) period, during which the sandwich is retained in the dark and at the end of which the sandwich may be moved into the light and the sheets separated. The apparatus includes means for transporting the sandwich through the housing within a lighttight environment and then guiding the sandwich from the housing through withdrawal opening 36. This means comprises a pair of rolls 156 and 158 mounted in juxtaposition within the housing adjacent and in closing relation to withdrawal opening 36. Both of rolls 156 and 158 preferably comprise surface layers of a compliant material having a high coefficient of friction, rubber being desirable for this purpose. Roll 158 is mounted for rotation on lower chassis 50 closely adjacent forward end wall 38. Roll 156 is mounted for rotary movement at its ends on arms 160, in turn pivotally mounted on intermediate chassis 72. Torsion springs 162 are provided for biasing arms 160 so as to urge roll 156 toward and into engagement with roll 158 when the apparatus is in the operative position shown in FIG. 3. Mounting of roll 156 on intermediate chassis 72 permits roll 156 to be spaced apart from roll 158 when the apparatus is in the open position shown in FIG. 4, thereby permitting the photosensitive and second sheets to be threaded between pressure-applying rolls 124 and 126 and between rolls 156 and 158. Tabs 164 are provided on the lower portion of arms 74 of intermediate chassis 72 for engaging arms 160 and acting as a stop for pivotal movement of arms 160 when the intermediate chassis is pivoted to an open position.

The document copying apparatus of the invention is intended, as previously noted, to be manually operated and, in the form shown in FIGS. 1 through 8, is operated by grasping and pulling on a portion of the sandwich comprising the photosensitive and second sheets projecting from the housing through withdrawal passage 36. To operate the apparatus to make a copy, the operator introduces a container 130 into the housing through opening 136, depresses button 146 and holds the button depressed while withdrawing the container from the housing. This provides an elongated mass of fluid on the portion of the photosensitive sheet extending between guide roll 102 and pressure-applying rolls 124 and 126; thereupon the operator introduces an original 106 into passage 20 until the leading end of the original is at the bite of inlet feed rolls 108, whereupon the operator grasps the end portions of the photosensitive and second sheets extending through passage 36 and pulls the photosensitive and image-receiving sheets to advance them through the apparatus. It is during this advancement that the original is fed into superposition with the photosensitive sheet between the latter and tube 98, the photosensitive sheet is exposed and the exposed area of the photosensitive sheet is advanced in superposition with an area of the image-receiving sheet between the pressure-applying rolls to distribute the fluid and form a sandwich which is advanced from the pressure-applying rolls to rolls 156 and 158 and thence from the apparatus through withdrawal passage 36. The apparatus includes a transmission driven by frictional engagement of one of the sheets with one of the rolls and connected with the various components of the apparatus for effecting the introduction and ejection of the original and the exposure of the photosensitive sheet. In the form shown in FIG. 8, the transmission is driven by frictional engagement of the photosensitive sheet with roll 158, and comprises a sequence of engaged torque transmitting members such as toothed or friction gears, the latter being shown as the preferred form because many of the friction gears which are required to coact are on different chassis.

The transmission includes a first friction roll 166 keyed to the shaft on which roll 158 is mounted, and a second (idler) friction roll 168 mounted on side plate 56 of lower chassis 50 in frictional engagement with friction roll 166. Each of outlet feed rolls 112 is connected to a friction roll 170, the latter being frictionally engaged with one another and one of friction rolls 170 being frictionally engaged with second friction roll 168, the latter transmitting torque to friction roll 170 with which it is engaged for rotating the output feed rolls. Torque is transmitted to the inlet feed rolls 108 through an idler friction roll 172 engaged with one of friction rolls 170 and with one of a second pair of friction rolls 174 coupled with inlet feed rolls 108. Only one of outlet feed rolls 112 need be driven to feed the original from the apparatus when the leading edge of the original has been fed from the bite of tube 98 and guide roll 102 into the bite of the outlet feed rolls. The other friction roll 170 would then merely function as an idler for transmitting torque from the driving friction roll 170 to idler friction roll 172.

As previously noted, the document copying apparatus of the invention is designed to be operated manually without the need for an outside source of electrical power; and power for the light sources, i.e., lamps 92, is supplied manually in conjunction with advancement and processing of the sheet materials. Current for the lamps is supplied by a direct or alternating current generator, designated 176, connected to the transmission through a friction drive roll 178 and an idler friction roll 180 keyed to the same shaft as idler friction roll 172. Generator 176 is shown as being mounted on upper wall 18 of the upper housing section intermediate inlet and exit passages 20 and 22. Reference is now made to FIG. 10 of the drawings for a circuit diagram showing the electrical connections between the generator and lamps 92 and one system for determining which of the two lamps is to be employed for exposure and the intensity of the lamp. One output terminal of the generator is grounded in the chassis and the other output terminal is connected to a rheostat 182 having separate parallel windings each connected in series with one of lamps 92. The construction of the rheostat is such that only one of the windings is employed at any time so that only one of the lamps is illuminated. A control knob 184 is provided on the rheostat exteriorly of the housing so that the lamps may be employed selectively and the intensity thereof may be controlled.

The exposure of the photosensitive sheet and the duration of the processing of the photosensitive and image-receiving sheets are a function of the rate of advancement of the sheets through the apparatus and, accordingly, the rate of movement of the sheets through the apparatus must be controlled. For this purpose the apparatus is provided with a governor designated 186. Governor 186 may be of a conventional mechanical type mounted, for example, coaxially with generator 176 on the same shaft or, as in the form shown, may be mounted apart from a generator and connected to the transmission through a friction drive roll 188 frictionally engaged with idler friction roll 180. The governor functions to limit the speed of the transmission and thereby control the output of the generator and, hence, intensity of lamps 92; and also controls the rate at which the photosensitive sheet is moved through the apparatus so that the period during which any portion of the photosensitive sheet is subjected to exposure to light from rods 84 is substantially predetermined and constant. The rate of movement of the sandwich comprising the exposed photosensitive sheet and the image-receiving sheet from pressure-applying rolls 124 and 126 to rolls 156 and 158 is also controlled so that the processing or imbibition period is of a predetermined constant duration.

When making a copy of a document, the portion of the sandwich projecting from the apparatus through opening 36 is pulled until a predetermined length of the two sheets is advanced through the apparatus. This length is approximately equal to the length of the document being copied plus sufficient extra sheet material to advance the portion of the sandwich containing the copy completely from the apparatus through opening 36. In accordance with the invention, an indexing and metering mechanism is provided in the apparatus and coupled with the roll 158 for metering the length of the sheets advanced through the apparatus during the production of each copy, and then arresting the movement of roll 158 and the sheets when a sufficient length of the sheet materials has been withdrawn through the apparatus. The aforementioned extra length of sandwich is obviously at least equal to the sheet path length between guide roll 102 and opening 36 and also serves to trap and retain any excess processing fluid which is distributed between the sheets beyond the trailing edges of the exposed area of the photosensitive sheet and image-receiving area of the second sheet.

When a length of sandwich containing a copy of an original has been advanced from the apparatus through withdrawal opening 36, this length of sandwich is then severed in the region of the withdrawal opening from the portion of the sandwich remaining within the apparatus. Severance of the sandwich is accomplished with the aid of a cutter bar 190 mounted on arms 192 which are pivotally mounted on upper chassis 58. Arms 192 extend through slots in forward end wall 40 and cutter bar 190 is located exteriorly of the forward end wall and is pivotable from a position with its lower edge, designated 194, disposed adjacent and just above opening 36 to a second position with edge 194 disposed below opening 36 and abutting a shoulder 196 at the juncture of forward end wall 38 and bottom wall 46. Pivoting cutter bar 190 downward (in a clockwise direction viewing FIG. 3) causes a short section of the sandwich to be retained between the cutter bar and end wall 38, and this section of the sandwich functions as a leader which may be grasped after the sandwich has been severed therefrom by tearing the sandwich against edge 194 of the cutter bar which, incidentally, may be sharpened to facilitate this operation. A torsion spring (not shown) may be provided for urging the cutter bar counterclockwise (viewing FIG. 3) into the upper position shown in the drawings, at which position the operator may grasp the section of the sandwich extending through opening 36 for pulling the sheets through the apparatus to produce a copy of an original document.

The length of the photosensitive and second sheets advanced through the apparatus during the exposure and processing of a portion of the photosensitive sheet to produce a copy is a function of the length of the portion of the photosensitive sheet which is exposed in superposition with the original document. The indexing means of the invention is designed to permit the document copying apparatus to be used for making copies of documents of different lengths and, in the preferred form, is designed to make copies of documents of the two conventional lengths, that is, 11 and 14 inches. The length of the sheets advanced through the apparatus during the production of a copy is approximately equal to the length of the copy plus the extra length necessary to advance the portion of the sandwich including the copy from the apparatus through opening 36, and this length is determined by the number of revolutions permitted of roll 158.

Figure 12:
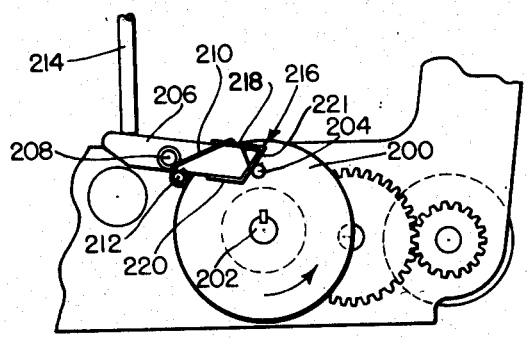
FIGS. 12 and 13 are elevational views of components of the indexing system of FIG. 11 illustrating two operative positions of the components.
Figure 13:
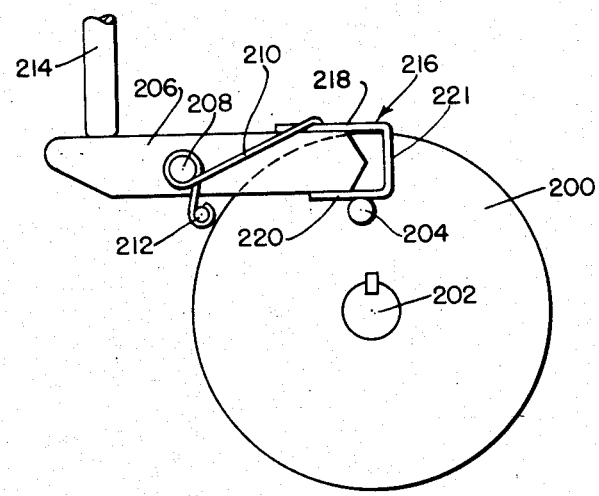

The indexing means of the invention is designed to arrest the movement of the sandwich after advancement of either of two different predetermined lengths of the sheets has been moved through the apparatus, these lengths differing from one another by approximately three inches (the difference between the lengths of standard size documents). The indexing means comprise a stop member in the form of a disk 200 keyed to a rotatably mounted shaft 202 and having mounted thereon a stop pin 204. Disk 200 is designed to be rotated through one complete revolution (360°) during the advancement of a predetermined length of the photosensitive and second sheets through the apparatus. Rotation of the disk at the end of one revolution is arrested by an engagement member in the form of an engagement arm 206 pivotally mounted intermediate its ends on a stud 208. Engagement arm 206 is biased by a torsion spring 210 in a clockwise direction (viewing FIGS. 12 and 13) into the position shown in FIG. 12, at which one end of arm 206 is located in the path of movement of pin 204. A second stud 212 is provided as a stop against which the arm is urged by spring 210 into the aforementioned operative position at which the arm engages the pin and arrests the rotation of disk 200. A means is provided for disengaging arm 206 from pin 204 to permit the disk to resume its rotation, and, in the form shown, this means comprises rod 214 extending from the housing of the apparatus and adapted to be depressed for engaging the other end of arm 206 and pivoting the arm in a counterclockwise direction to the inoperative position shown in FIG. 13. To prevent the arm from returning to its operative position where it will again prevent the resumption of rotation of disk 200, there is provided on the end of arm 206 a generally U-shaped spring 216. Spring 216 includes a pair of arms, one designated 218, secured to one side of arm 206, the other designated 220 located adjacent the opposite side of arm 206 and being free to move, and a connecting portion 221 which extends from between arms 218 and 220 across the end of arm 206. Spring 216 is biased into the position shown in FIG. 13 wherein connecting portion 221 is spaced from the end of arm 206, and it is this connecting portion 221 which is engaged by pin 204 during rotation of the latter (in a counterclockwise direction viewing FIG. 12) and is deformed by the pin until connecting portion 221 contacts the end of arm 206, as shown in FIG. 12, at which position rotation of disk 200 is arrested. When arm 206 is pivoted to the operative position, spring 216 then returns to the position shown in FIG. 13 with connecting member 221 spaced from the end of arm 206 so that arm 220 rests on pin 204, permitting disk 200 to be rotated through another revolution.

The arresting mechanism, including the means permitting the selective advancement of two different lengths of the sheets through the apparatus, comprises a transmission including two torque-transmitting gear trains having different speed ratios and capable of being selectively coupled between disk 200 and roll 158 for transmitting torque from roll 158 to disk 200. This transmission includes first drive gears 222 keyed to the shaft on which roll 158 is mounted. One of the selectively engageable gear trains includes an idler gear 224 engaged with one of gears 222 and keyed to a shaft 226 on which is keyed a transfer gear 228 in turn engaged with a drive gear 230 mounted on shaft 202 for rotation with respect to the shaft. The other selectively couplable gear train is similar in construction and comprises an idler gear 234 meshed with the other of gears 222 and keyed to shaft 236 on which is keyed a transfer gear 238 engaged with a drive gear 240 mounted on shaft 202 for rotation with respect to the shaft. The speed ratio of the gear train comprising gears 224, 228 and 230 is different from the speed ratio of the gear train comprising gears 234, 238 and 240, so that one permits roll 158 to be rotated through a greater number of revolutions during a single revolution of disk 200. Each of gears 230 and 240 is provided with a clutch face 242 for engaging clutch faces on the ends of an elongated sleeve 244 mounted on shaft 202 intermediate gears 230 and 240. Sleeve 244 is keyed to shaft 202 and is mounted on the shaft for axial movement into engagement with either of gears 230 or 240 for coupling shaft 202 to roll 158 through either of the aforementioned gear trains. As a means for moving sleeve 244 axially to "shift gears," there is provided a bifurcated lever 246 engaged in a groove in the periphery of sleeve 244 and connected through a suitable linkage (not shown) to a manually operable control lever 248 projecting from the housing of the apparatus. A means is also provided for retaining sleeve 244 in each of its positions in which one of the pairs of clutch faces are engaged. This means comprises a pair of detents 250 located in a diametral bore in shaft 202 and spring loaded outwardly for engaging grooves 252 in the inner wall of sleeve 244. Friction roll 166 is keyed to the same shaft as one of drive gears 222 outboard of the drive gear.

The processing fluid is distributed between the superposed photosensitive and second sheets by advancement of the sheets between pressure-applying rolls 124 and 126. As the sheets advance between the rolls, the mass of fluid between the sheets is moved relative to the sheets in a direction opposite to the direction of movement of the sheets. Means are provided for insuring that this mass of fluid is not spread by the pressure-applying rolls from one exposed portion of the photosensitive sheet to the next succeeding exposed portion of the photosensitive sheet, by trapping the fluid between portions of the superposed sheets intermediate the exposed portions of the photosensitive sheet. This trapping means comprises means for spacing apart pressure-applying rolls 124 and 126 after an exposed portion of the photosensitive sheet has been advanced between the pressure-applying rolls, and, in the form shown, includes an end section 254 of each of arms 127 which functions as a cam follower and is positioned in engagement with a cam 256 keyed to shaft 202. Each of cams 256 is designated to make a single revolution with shaft 202 and coact with an end section 254 of one arm 127 for pivoting the arm in a counterclockwise direction to move roll 126 away from roll 124 after the cam has moved through a part of one revolution sufficient to insure advancement of an exposed portion of the photosensitive sheet between the pressure-applying rolls. Cam 256 permits pressure-applying roll 126 to move toward roll 124 at the beginning of each sheet advance cycle of the apparatus.

To operate the document copying apparatus of the invention to make a copy of an original, the operator introduces a container 130 of processing fluid into the housing through opening 136, depresses button 146 and withdraws the container while holding the button depressed. He then introduces the original into inlet passage 20, momentarily depresses rod 214 and then grasps and pulls on the leading end of the sandwich projecting from the housing through opening 36 until movement of the sandwich is arrested. Cutter bar 190 is then depressed and the sandwich comprising an exposed portion of the photosensitive sheet is severed from other portions of the sandwich remaining in the apparatus on the inside of the cutter bar. During advancement of the sandwich (sheets), the original is fed into the apparatus and is superposed with the photosensitive sheet while the latter is being exposed; and is then advanced from the apparatus through exit passage 22. It is contemplated that, in another embodiment of the apparatus, push buttom 146, which is actuated for compressing the container of processing fluid as the latter is withdrawn, may be coupled with the means for releasing arm 206 from engagement with the pin on disk 200 so that only one member need be actuated manually for providing the processing fluid on the photosensitive sheet and releasing the indexing mechanism to permit another operative cycle of the apparatus. The operator, of course, moves control lever 248 to the proper position to select the gear train which determines the length of the sheets advanced in accordance with the length of the document to be copied.

Since certain changes may be made in the above apparatus without departing from the scope of the invention herein involved, it is intended that all matter contained in the above description or shown in the accompanying drawings shall be interpreted as illustrative and not in a limiting sense.

What is claimed is:

1. Photographic document copying apparatus comprising, in combination, means for exposing successive areas of a photosensitive sheet during movement of said sheet through said apparatus; means for engaging and processing said exposed photosensitive areas of said photosensitive sheet during movement thereof through said apparatus; and indexing means for controlling the advancement of said photosensitive sheet through said apparatus by arresting the movement of said photosensitive sheet when an exposed area has been advanced into engagement with said processing means, said indexing means being adjustable to permit advancement of predetermined selected lengths of said photosensitive sheet through said apparatus, said lengths being selected so that areas of said photosensitive sheet correspond in length to the lengths of original documents being copied, said indexing means including an engagement member positioned in engagement with said photosensitve sheet and movable in response to movement of said photosensitive sheet through said apparatus, and control means including two stop means capable of being selectively coupled with said engagement member for predeterminedly limiting the movement of said member in response to movement of said photosensitive sheet, said stop means including a common stop member movable through a fixed distance and two coupling means for coupling said stop member with said engagement member to permit movement of said engagement member through different fixed distances predeterminedly selected in accordance with the lengths of the original documents to be copied during movement of said stop member through said fixed distance.

2. The photographic apparatus of claim 1 wherein each of said coupling means comprise a transmission having a speed ratio different from the other.

3. Photographic document copying apparatus comprising, in combination, means for exposing successive portions of a photosensitive sheet during movement thereof through said apparatus; means for holding original documents in superposition with portions of said photosensitive sheet during exposure thereof; means for processing exposed portions of said photosensitive sheet during movement thereof through said apparatus by superposing said portions of said photosensitive sheet with areas of a second sheet and distributing a processing fluid between said portions and areas of the superposed sheets; and indexing means for controlling the advancement of said photosensitive sheet through said apparatus by arresting the movement of said photosensitive sheet when an exposed portion thereof has been advanced through a predetermined distance in superposition with said second sheet, said indexing means being adjustable for allowing the advancement of predetermined selected lengths of said photosensitive sheet through said apparatus, said lengths being selected so that said portions of said photosensitive sheet correspond in length to the lengths of originals being copied, said indexing means including an engagement member positioned in engagement with one of said sheets and movable in response to movement of said photosensitive sheet through said apparatus, and control means including two stop means capable of being selectively coupled with said engagement member for predeterminedly limiting the movement of said member in response to movement of said photosensitive sheet, said stop means including a common stop member movable through a fixed distance and two coupling means for alternatively coupling said stop member with said engagement member to permit movement of said engagement member through different fixed distances predeterminedly selected in accordance with the lengths of the original documents to be copied by said apparatus during movement of said stop member through said fixed distance.

4. Photographic document copying apparatus comprising, in combination, means for exposing said photosensitive sheet during movement thereof through said apparatus; means for engaging and processing said exposed portions of said photosensitive sheet during movement thereof through said apparatus by superposing said portions of said photosensitive sheet with areas of a second sheet and distributing a processing fluid between said sheets; and indexing means for controlling the advancement of said photosensitive sheet through said apparatus by arresting the movement of said photosensitive sheet when an exposed portion thereof has been advanced a predetermined distance in superposition with said second sheet, said indexing means being adjustable for allowing the advancement of predetermined selected lengths of said photosensitive sheet through said apparatus, said lengths being selected so that said portions of said photosensitive sheet correspond in length to the lengths of originals being copied, said indexing means including a roll mounted for rotation in engagement with one of said photosensitive and second sheets in response to movement of said photosensitive sheet through and from said apparatus, and control means for arresting the rotation of said roll after a predetermined number of revolutions thereof, said control means including a stop member movable through a predetermined fixed distance and two torque-transmitting means for alternatively coupling said roll with said stop member, said torque-transmitting means having different speed ratios and being selectively engageable at the commencement of advancement of said photosensitive sheet for varying the number of revolutions permitted of said roll depending on the length of the original document to be copied.

5. The photographic apparatus of claim 5 wherein said roll is provided with a yielding surface disposed in frictional engagement with one of said photosensitive and second sheets.

6. The photographic apparatus of claim 4 wherein said stop member is rotatable and an engagement member is provided for limiting the rotation of said stop member.

7. The photographic apparatus of claim 6 wherein said engagement member coacts with a portion of said stop member to limit the rotation of said stop member to one revolution, and said engagement member is manually disengageable from said stop member to permit said stop member to rotate through another single revolution.

8. The photographic apparatus of claim 4 wherein said torque-transmitting means comprise two gear trains having different speed ratios, and manually operable coupling means for selectively coupling one of said gear trains with said stop member and said roll.

9. The photographic apparatus of claim 4 wherein a housing is provided for enclosing said apparatus and includes an opening through which said sheet is movable and said roll is one of a pair of juxtaposed rolls provided with yielding surfaces and mounted adjacent said opening in closing relation thereto for preventing admission of light through said opening into said housing.

10. Photographic document copying apparatus comprising, in combination, means for exposing successive portions of a photosensitive sheet during movement thereof through said apparatus; means for processing said exposed portions of said photosensitive sheet during movement thereof through said apparatus by superposing said portions of said photosensitive sheet with areas of a second sheet and distributing a processing fluid between said sheets, the last-mentioned means including a pair of juxtaposed pressure-applying members between which said sheets are moved, one of said pressure-applying members being movable toward and away from the other of said pressure-applying members and being biased toward said other pressure-applying member; and indexing means for controlling the advancement of said photosensitive sheet through said apparatus by arresting the movement of said photosensitive sheet when an exposed portion thereof has been advanced in superposition with said second sheet a predetermined distance through said apparatus, said indexing means being adjustable for allowing the advancement of predetermined selected lengths of said photosensitive sheet through said apparatus, said lengths being selected so that said portions of said photosensitive sheet correspond in length to the lengths of originals being copied, said indexing means including a sheet engagement member positioned in engagement with one of said sheets and movable in response to movement of said photosensitive sheet, and two control means capable of being selectively coupled with said engagement member for limiting the movement of said engagement member in response to movement of said photosensitive sheet through said apparatus, said indexing means including means coupled with said one pressure-applying member and said engagement member for spacing said one pressure-applying member apart from said other pressure-applying member during movement of said photosensitive sheet through said apparatus after said portion of said photosensitive sheet has passed between said pressure-applying members.

11. The photographic apparatus of claim 10 wherein said control means include means operative alternatively for limiting said movement of said engagement member through two different distances.

12. The photographic apparatus of claim 10 wherein said control means include rotary means, a stop member for limiting the rotation of said rotary means to one revolution during advancement of said photosensitive sheet through said apparatus to produce a copy, two torque-transmitting means having different speed ratios and capable of being selectively coupled between said engagement member and said rotary means for imparting rotation to said rotary means in response to advancement of said photosensitive sheet through said apparatus, and means coupled with said one pressure-applying member for coacting with said rotary means during said one revolution thereof for spacing said one pressure-applying member apart from said other pressure-applying member.

13. Photographic document copying apparatus comprising, in combination, means for exposing successive portions of a photosensitive sheet during movement thereof through said apparatus; means for processing exposed portions of said photosensitive sheet during movement thereof through said apparatus by superposing said portions of said photosensitive sheet with areas of a second sheet and distributing a processing fluid between said sheets, the last-mentioned means comprising a pair of juxtaposed pressure-applying members between which said photosensitive and second sheets are moved, one of said pressure-applying members being movable toward and away from the other of said pressure-applying members and being biased toward said other pressure-applying member; indexing means for controlling the advancement of said photosensitive sheet through said apparatus by arresting the movement of said photosensitive sheet when an exposed portion thereof has been advanced in superposition with said second sheet a predetermined distance through said apparatus, said indexing means being adjustable for allowing the advancement of predetermined selected lengths of said photosensitive sheet through said apparatus, said lengths being selected so that said portions of said photosensitive sheet correspond in length to the lengths of originals being copied, said indexing means including a roll mounted for rotation in engagement with one of said photosensitive and second sheets in response to movement of said photosensitive sheet through said apparatus, and control means for arresting the rotation of said roll after a predetermined number of revolutions thereof, said control means including stop means movable through a predetermined fixed distance during exposure and processing of said portion of said photosensitive sheet to produce a copy, and two torque-transmitting means having different speed ratios and being selectively coupled at the commencement of advancement of said photosensitive sheet between said roll and said stop means for varying the number of revolutions permitted of said roll depending on the length of the original document to be copied; and means for trapping said processing fluid between said photosensitive and second sheets by spacing apart said pressure-applying members during movement of said photosensitive sheet through said apparatus after said portion of said photosensitive sheet has passed between said pressure-applying members, the last-mentioned means including means coupled with said stop means and said one pressure-applying member for moving said one pressure-applying member apart from said other pressure-applying member after a predetermined number of revolutions of said roll depending on the torque-transmitting means coupled between said roll and said stop means at the commencement of advancement of said photosensitive sheet.

14. The photographic apparatus of claim 13 wherein said stop means comprise rotary means movable through one revolution during advancement of said photosensitive sheet through said apparatus to expose said portion of said photosensitive sheet and produce a copy, said torque-transmitting means are coupled with said rotary means and said roll for rotating said rotary means in response to rotation of said roll, said rotary means includes a cam movable through one revolution and said last-mentioned means includes a cam follower coacting with said cam for spacing said one pressure-applying member apart from said other pressure-applying member.

References Cited in the file of this patent

UNITED STATES PATENTS

| | | |
|---|---|---|
| 849,184 | Auld | Apr. 2, 1907 |
| 1,344,207 | Miles | June 22, 1920 |
| 2,653,527 | Land | Sept. 29, 1953 |
| 2,732,778 | Limberger | Jan. 31, 1956 |
| 2,939,372 | Baumbach | June 7, 1960 |